(12) United States Patent
Waragai

(10) Patent No.: US 11,409,394 B2
(45) Date of Patent: Aug. 9, 2022

(54) LIQUID CRYSTAL DISPLAY DEVICE TO IMPROVE DISPLAY QUALITY DURING HOVER OPERATION

(71) Applicant: ALPINE ELECTRONICS, INC., Tokyo (JP)

(72) Inventor: Tomoaki Waragai, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 42 days.

(21) Appl. No.: 17/097,552

(22) Filed: Nov. 13, 2020

(65) Prior Publication Data

US 2021/0191178 A1 Jun. 24, 2021

(30) Foreign Application Priority Data

Dec. 19, 2019 (JP) .............................. JP2019-228761

(51) Int. Cl.
*G06F 3/041* (2006.01)

(52) U.S. Cl.
CPC .......... *G06F 3/0418* (2013.01); *G06F 3/0412* (2013.01); *G06F 2203/04101* (2013.01); *G06F 2203/04107* (2013.01); *G06F 2203/04108* (2013.01)

(58) Field of Classification Search
CPC ......... G06F 3/0412; G06F 2203/04107; G06F 3/044–0448; G06F 3/0416–04186
See application file for complete search history.

(56) References Cited

U.S. PATENT DOCUMENTS

| 5,202,676 | A | * | 4/1993 | Yamazaki | ............ | G09G 3/3681 |
| | | | | | | 345/94 |
| 7,633,484 | B2 | * | 12/2009 | Ito | .......................... | G06F 3/045 |
| | | | | | | 345/104 |
| 10,444,870 | B2 | | 10/2019 | Kadowaki et al. | | |
| 2005/0168450 | A1 | * | 8/2005 | Ito | .......................... | G06F 3/045 |
| | | | | | | 345/173 |

(Continued)

FOREIGN PATENT DOCUMENTS

| EP | 2 913 746 | 9/2015 |
| JP | 2014-203278 | 10/2014 |
| KR | 2016 0082875 | 7/2016 |

OTHER PUBLICATIONS

Extended European Search Report for 20211444.3 dated May 19, 2021, 12 pgs.

*Primary Examiner* — Patrick F Marinelli
(74) *Attorney, Agent, or Firm* — Crowell & Moring LLP

(57) ABSTRACT

A liquid crystal display device includes: a first electrode layer provided on a display surface side to prevent noise from being emitted from a display element to the outside; a second electrode layer provided outside the first electrode layer to perform position detection; a hover signal generation unit that generates a detection signal to be input to the second electrode layer and the first electrode layer for detection of an indicator approaching the display surface; a common electrode that applies a common voltage to derive the display element; a cancellation signal generation unit that generates a cancellation signal which cancels a signal component leaking from the first electrode layer to the common electrode; and a voltage addition unit that superimposes a cancellation signal on the common voltage.

14 Claims, 4 Drawing Sheets

(56) References Cited

U.S. PATENT DOCUMENTS

| | | | |
|---|---|---|---|
| 2011/0007021 A1* | 1/2011 | Bernstein | G06F 3/0446 715/702 |
| 2014/0152619 A1* | 6/2014 | Hotelling | G09G 3/3614 345/174 |
| 2015/0378471 A1* | 12/2015 | Liu | G06F 3/0412 345/174 |
| 2016/0195956 A1 | 7/2016 | Zhao et al. | |
| 2021/0191178 A1* | 6/2021 | Waragai | G06F 3/0418 |

* cited by examiner

LIQUID CRYSTAL DISPLAY DEVICE TO IMPROVE DISPLAY QUALITY DURING HOVER OPERATION

RELATED APPLICATION

The present application claims priority to Japanese Patent Application Number 2019-228761, filed Dec. 19, 2019, the entirety of which is hereby incorporated by reference.

BACKGROUND

1. Field of the Invention

The present invention relates to a liquid crystal display device having a touch panel that enables a hover operation.

2. Description of the Related Art

Conventionally, there is known a touch panel which is provided on a surface of a liquid crystal display device and can detect a position of an approaching indicator (for example, a user's fingertip) while detecting a contact position (refer to, for example, JP 2014-203278 A). In this touch panel, hover detection is performed by detecting a voltage generated in an auxiliary electrode, and a hover operation can be performed by a user.

Meanwhile, as one of the methods for detecting the above-described hover operation, there is known a method of applying a sinusoidal signal to an electrode and detecting a change in a detection signal accompanying a change in capacitance due to an approach of an indicator. However, when such a hover operation is performed in parallel with a display operation, the sinusoidal signal for the hover operation detection leaks to a common electrode of a liquid crystal display device via a coupling capacitance so that a voltage fluctuation caused by such a leaked component becomes noise, which causes a problem of deterioration in display quality. This noise can be reduced by providing a shield layer between the electrode for the hover operation detection and the common electrode and connecting this shield layer to a ground potential, which is not desirable due to an increase in cost accompanying the addition of a component.

SUMMARY

The present disclosure has been made in view of these points, and an object thereof is to provide a liquid crystal display device capable of suppressing deterioration in display quality during a hover operation and an increase in cost for reducing the deterioration.

In order to solve the above-described problems, a liquid crystal display device of the present disclosure includes: a first electrode layer provided on a display surface side to prevent noise from being emitted from a display element to an outside; a second electrode layer provided outside the first electrode layer to perform position detection; a detection signal generation unit that generates a detection signal to be input to the first and second electrode layers for detection of an indicator approaching the display surface; a common electrode that applies a common voltage to drive the display element; a cancellation signal generation unit that generates a cancellation signal which cancels a signal component leaking from the first electrode layer to the common electrode by applying the detection signal to the first and second electrode layers; and a common voltage correction unit that superimposes the cancellation signal on the common voltage.

When the detection signal is input to the two electrode layers for the hover operation, a signal component that leaks to the common electrode side is generated, but this component is canceled with the cancellation signal. Thus, a voltage fluctuation that occurs in the common electrode can be reduced, and the deterioration in display quality during the hover operation can be suppressed. In addition, an additional configuration such as a special shield layer is not required in order to reduce the voltage fluctuation generated in the common electrode so that the cost increase can be suppressed.

In addition, it is desirable that the above detection signal be a sinusoidal signal. When the sinusoidal signal having a simple shape is used, it is easy to detect a position of the hover operation and generate the cancellation signal.

In addition, it is desirable that the above cancellation signal generation unit generate the cancellation signal using the detection signal output from the detection signal generation unit. In particular, it is desirable that the above cancellation signal generation unit generate a cancellation signal by adjusting a phase and an amplitude of the detection signal output from the detection signal generation unit. When the cancellation signal is generated using the detection signal in this manner, it is easy to generate the cancellation signal that correlates with the detection signal.

In addition, it is desirable that the above cancellation signal generation unit generate the cancellation signal based on a voltage of the common electrode. In particular, it is desirable that the above cancellation signal generation unit generate the cancellation signal by adjusting a phase and an amplitude of the voltage of the common electrode. When the cancellation signal is generated using the voltage appearing in the common electrode in this manner, it is easy to generate the cancellation signal that correlates with the detection signal.

In addition, it is desirable that the above second electrode layer have a plurality of electrodes which are parallel to each of two adjacent sides of the display surface and intersect with each other, the detection signal be input to one end of the plurality of electrodes, and the detection signal of the indicator be extracted from another end of the plurality of electrodes. When the detection signals extracted from the respective electrodes are monitored in this manner, the position of the hover operation can be identified.

In addition, it is desirable to input the cancellation signal to a plurality of locations of the common electrode. As a result, it is possible to reduce a voltage change depending on the location of the common electrode.

In addition, it is desirable to perform a display operation using the above display element and an input operation of the detection signal to the first and second electrode layers in parallel. As a result, it is possible to suppress the deterioration in display quality and the increase in cost for reducing the deterioration when the display operation and the hover operation in the liquid crystal display device are performed at the same time.

DETAILED DESCRIPTION OF THE
PREFERRED EMBODIMENTS

Hereinafter, a liquid crystal display device according to an embodiment of the present invention will be described with reference to the drawings.

Figure 1:
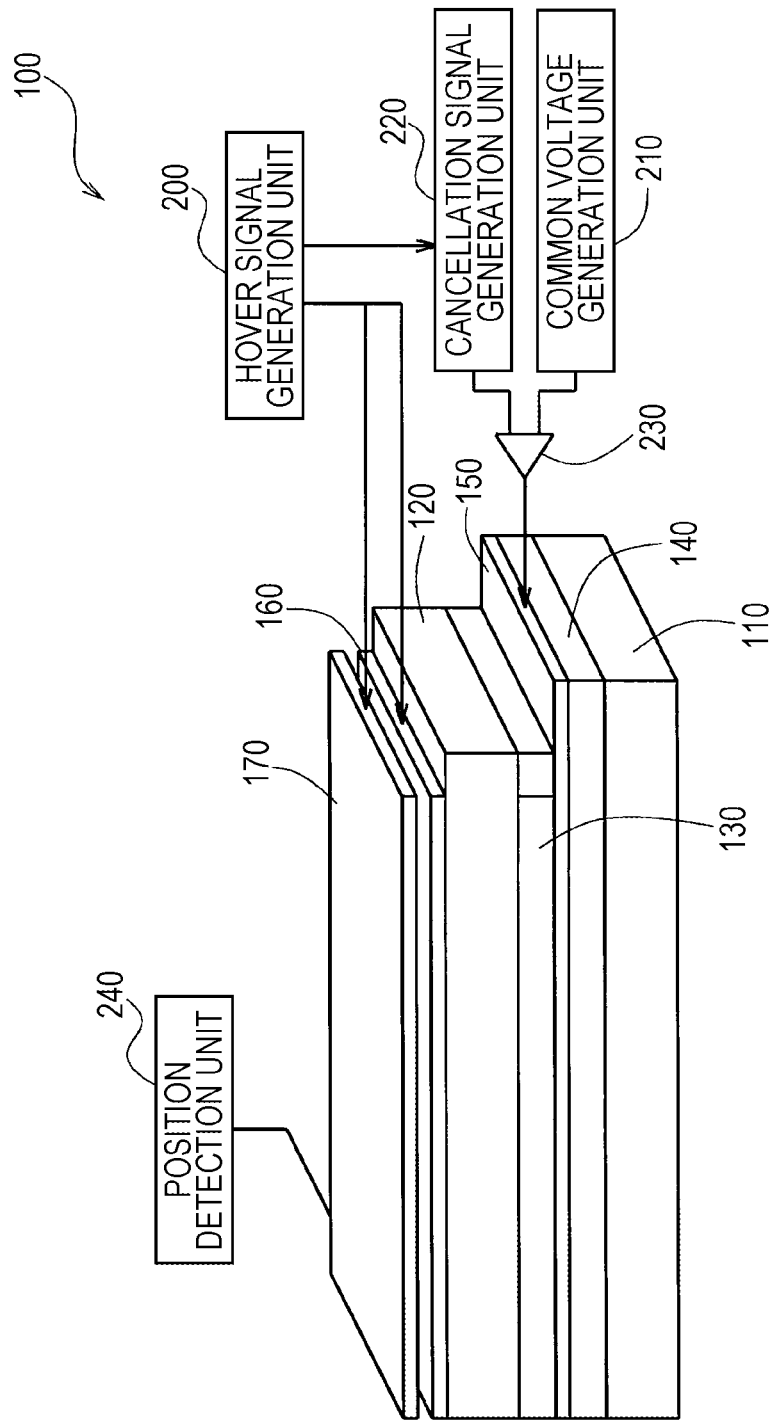
FIG. 1 is a view illustrating a schematic structure of a liquid crystal display device according to an embodiment.

FIG. 1 is a view illustrating a schematic structure of the liquid crystal display device of the present embodiment. As illustrated in FIG. 1, a liquid crystal display device 100 of the present embodiment includes an array glass 110, a color filter (CF) glass 120, a liquid crystal layer 130, a thin film transistor (TFT) array 140, a common electrode (VCOM ITO) 150, a back side electrode made of indium tin oxide (BS ITO) 160, a touch electrode made of indium tin oxide (touch ITOI 170, a hover signal generation unit 200, a common voltage generation unit 210, a cancellation signal generation unit 220, a voltage addition unit 230, and a position detection unit 240.

As illustrated in FIG. 1, the thin film transistor (TFT) array 140 and the flat plate-shaped common electrode VCOM-ITO 150 constituting display elements corresponding to display pixels are arranged on the array glass 110, and the liquid crystal layer 130 is arranged between the common electrode VCOM-ITO 150 and the CF glass 120.

An RGB filter (not illustrated) corresponding to the display pixels is formed on the surface of the CF glass 120. In addition, the flat plate-shaped back side electrode BS-ITO 160, configured to prevent noise from being emitted from the display element to the outside, is formed on the surface of the CF glass 120 (opposite to the liquid crystal layer 130). Further, the touch electrode 170 for position detection is formed outside the back side electrode BS-ITO 160.

Figure 2:
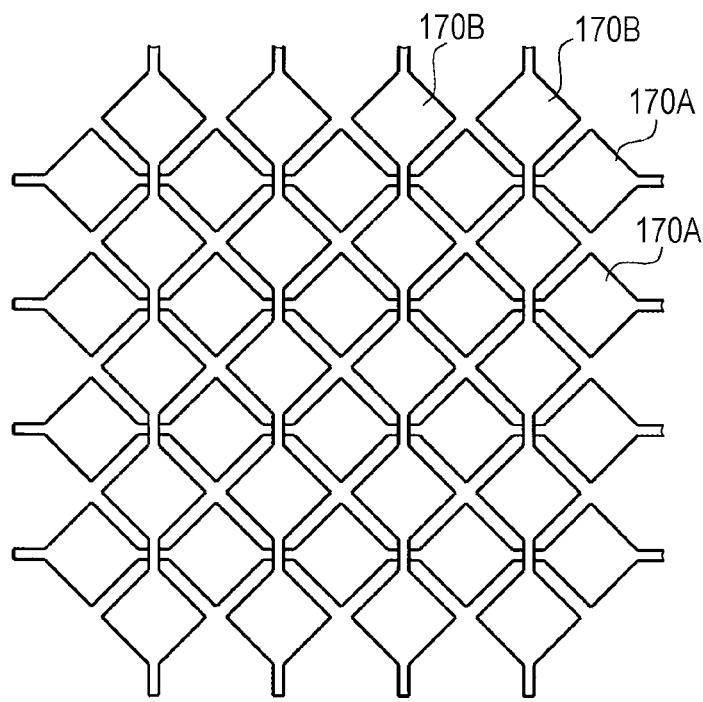
FIG. 2 is a view illustrating a specific example of a touch electrode made of indium tin oxide (touch ITO)

FIG. 2 is a view illustrating a specific example of the touch electrode 170. The touch electrode 170 forms a touch panel for position detection, and has a plurality of transparent electrodes 170A extending in an X direction (for example, a direction along a long side when assuming that the display surface has a horizontally long rectangular shape) and a plurality of transparent electrodes 170B extending in a Y direction (a direction along a short side of the rectangular shape). When detecting a contact position on the surface, a capacitance between these two types of the transparent electrodes 170A and 170B is detected. In the present embodiment, the hover signal generation unit 200 is provided to perform position detection for a hover operation (position detection of an indicator such as a finger located away from the surface) together with such detection of the contact position or instead of such detection of the contact position.

The hover signal generation unit 200 generates a detection signal (hover signal) which is used to detect the indicator such as the finger approaching the display surface during the hover operation. As the detection signal, for example, a sinusoidal signal is used. During the hover operation, the hover signal generation unit 200 inputs the detection signals to one end of the plurality of transparent electrodes 170A and 170B included in the touch electrode 170 and to the back side electrode BS-ITO 160.

The position detection unit 240 extracts the detection signals from the other end of the plurality of transparent electrodes 170A and 170B included in the touch electrode 170, and detects the position of the indicator approaching the touch electrode 170 based on signal levels thereof. When the indicator approaches, some detection signals flow to the indicator side via the capacitance generated between some transparent electrodes 170A and 170B, and thus, levels of the detection signals extracted from the other end of the transparent electrodes 170A and 170B become small. The position detection unit 240 can detect the position of the indicator approaching the touch electrode 170 before touching the touch electrode 170 by monitoring such a change in level.

Meanwhile, at the time of detecting the position of the hover operation, the detection signal generated by the hover signal generation unit 200 is also input to the back side electrode BS-ITO 160 in parallel with the touch electrode 170. Since this back side electrode BS-ITO 160 is arranged to face the common electrode VCOM-ITO 150 with the CF glass 120 and the liquid crystal layer 130 interposed therebetween, a signal component (voltage fluctuation) corresponding to an input detection signal appears on the common electrode VCOM-ITO 150 side via a coupling capacitance between the back side electrode BS-ITO 160 and the common electrode VCOM-ITO 150 when the sinusoidal detection signal is input to the back side electrode BS-ITO 160, and is superimposed on a common voltage applied to the common electrode VCOM-ITO 150.

In the present embodiment, the cancellation signal generation unit 220 and a voltage addition unit 230 are provided in order to cancel the component superimposed on the common voltage.

The cancellation signal generation unit 220 generates a cancellation signal which cancels the signal component leaking from the back side electrode BS-ITO 160 toward the common electrode VCOM-ITO 150. It is considered that the signal component leaking toward the common electrode VCOM-ITO 150 is synchronized with the detection signal (sinusoidal signal) input to the back side electrode BS-ITO 160. Therefore, the cancellation signal generation unit 220 adjusts a phase and an amplitude of the detection signal generated by the hover signal generation unit 200 to cancel the signal component leaking toward the common electrode VCOM-ITO 150 due to the input of the detection signal to the back side electrode BS-ITO 160, that is, to generate the cancellation signal having the same amplitude and inverted phase with respect to this signal component.

The voltage addition unit 230 adds the cancellation signal generated by the cancellation signal generation unit 220 to the common voltage generated by the common voltage generation unit 210. The common voltage on which this cancellation signal has been superimposed is applied to the common electrode VCOM-ITO 150.

Figure 3:
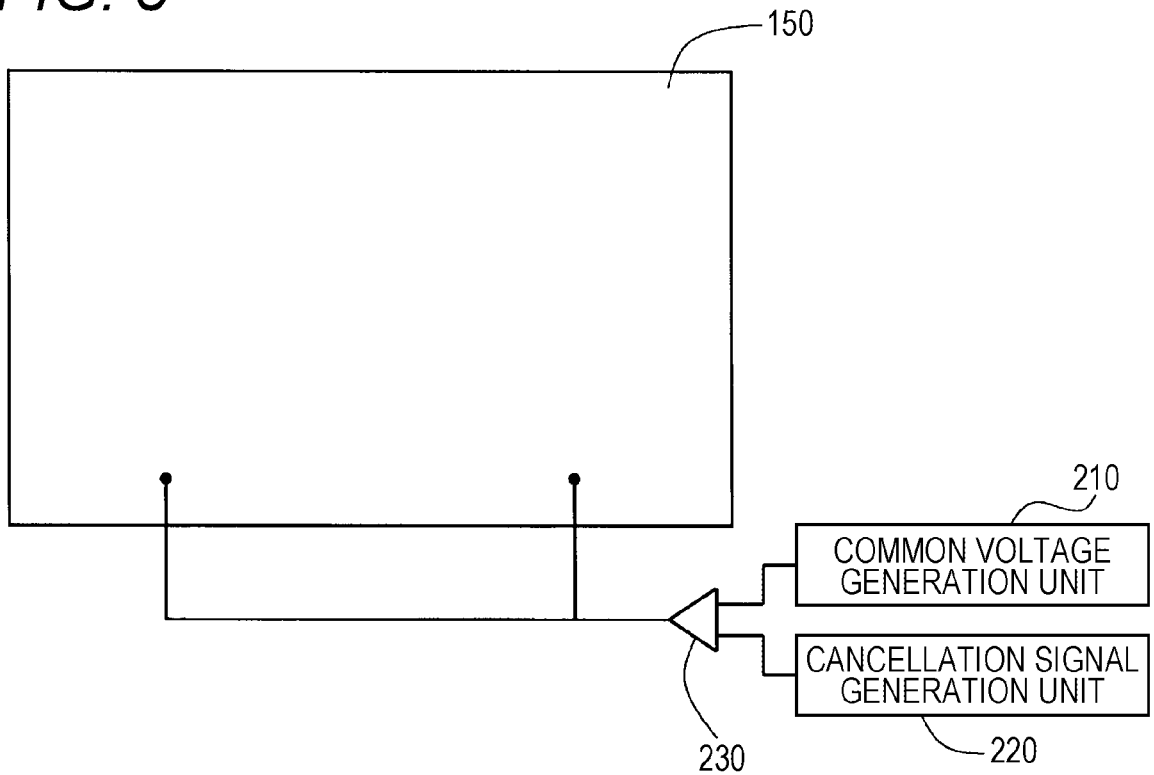
FIG. 3 is a view illustrating a specific example of applying a common voltage on which a cancellation signal has been superimposed on a common electrode VCOM-ITO.
Figure 4:
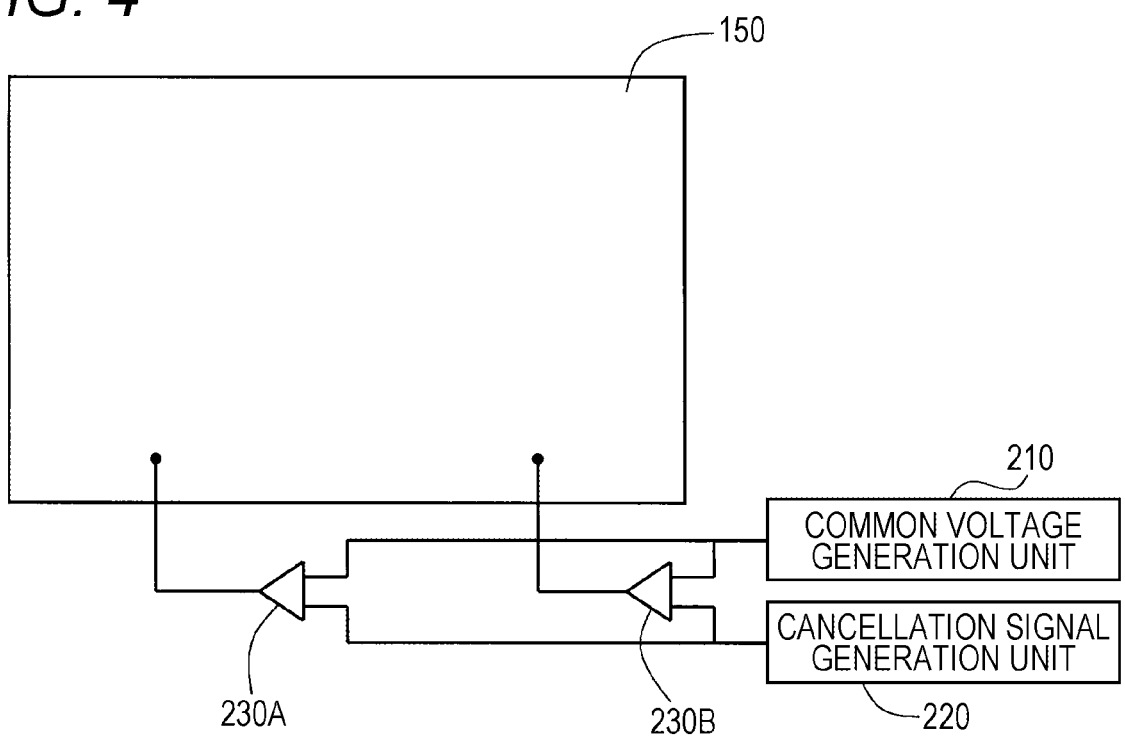
FIG. 4 is a view illustrating a specific example of applying the common voltage on which the cancellation signal has been superimposed on the common electrode VCOM-ITO.
Figure 5:
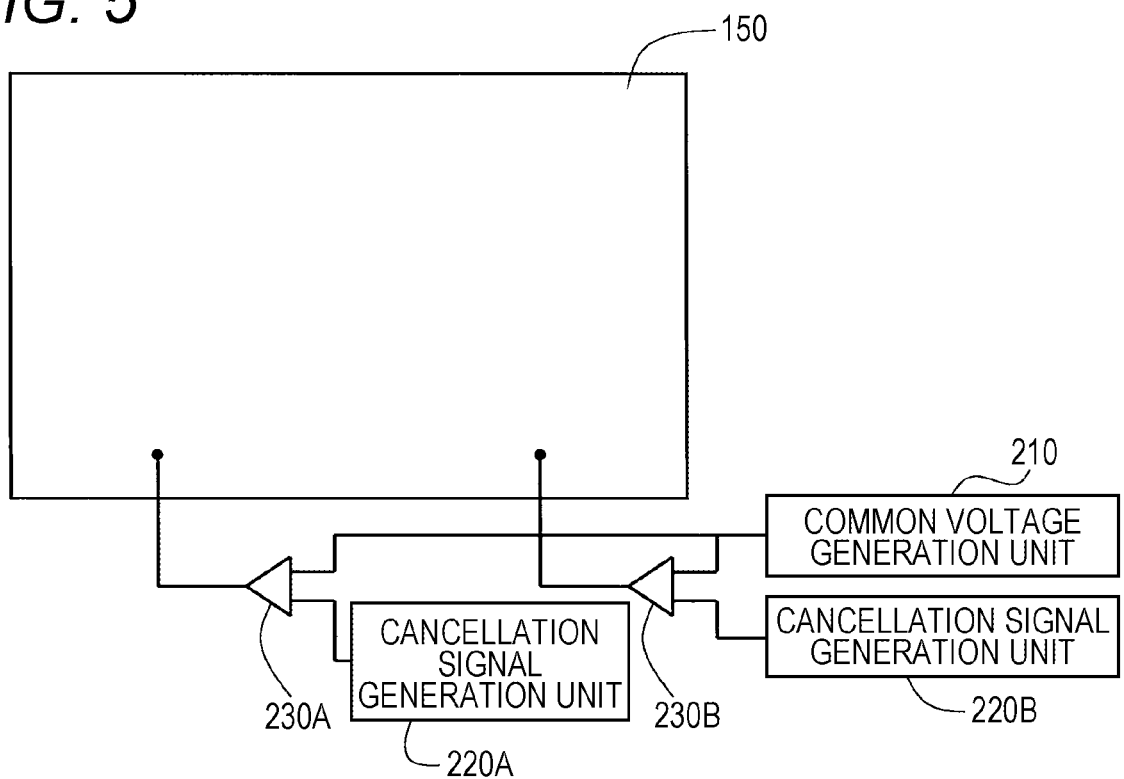
FIG. 5 is a view illustrating a specific example of applying the common voltage on which the cancellation signal has been superimposed on the common electrode VCOM-ITO.

FIGS. 3 to 5 are views illustrating specific examples of applying the common voltage on which the cancellation signal has been superimposed to the common electrode VCOM-ITO 150. In the example illustrated in FIG. 3, the common voltage output from the voltage addition unit 230 is applied to two locations of the common electrode VCOM-ITO 150. In the example illustrated in FIG. 4, the fact that the common voltage is applied to two locations is the same as the example illustrated in FIG. 3, but two voltage addition units 230A and 230B are provided to correspond to the respective locations. Each operation of the two voltage addition units 230A and 230B is the same as that of the voltage addition unit 230, and it is possible to shorten each length of a wiring from output ends of the voltage addition units 230A and 230B to locations where the common voltage is applied. As a result, noise superimposed on the wiring can be reduced. In the example illustrated in FIG. 5, the cancellation signal generation unit 220 is also divided into two (cancellation signal generation units 220A and 220B) in addition to the configuration illustrated in FIG. 4. Since the distribution of signal components leaking from the back side electrode BS-ITO 160 toward the common electrode VCOM-ITO 150 is not uniform in the common electrode VCOM-ITO 150, it is possible to further suppress the voltage fluctuation by adjusting the phase and the amplitude of the cancellation signal for each location where the common voltage is applied. Note that the common voltage may be applied at three or more locations.

The above back side electrode BS ITO 160 corresponds to a first electrode layer, and the touch electrode 170 corresponds to a second electrode layer, the hover signal generation unit 180 corresponds to a detection signal generation unit, and the voltage addition unit 230 corresponds to a common voltage correction unit.

In this manner, in the liquid crystal display device 100 of the present embodiment, the signal component that leaks toward the common electrode VCOM-ITO 150 is generated when the detection signal (hover signal) is input to the touch electrode 170 and the back side electrode BS-ITO 160 for the hover operation, but this component is cancelled with the cancellation signal. Thus, the voltage fluctuation that occurs in the common electrode VCOM-ITO 150 can be reduced, and it is possible to suppress the deterioration in display quality during the hover operation performed in parallel with the display operation using the display element. In addition, additional structure such as a special shield layer is not required in order to reduce the voltage fluctuation generated in the common electrode VCOM-ITO 150 so that the cost increase can be suppressed.

In particular, the sinusoidal signal having a simple shape is used as the detection signal, and thus, it is easy to detect the position of the hover operation and generate the cancellation signal.

In addition, the cancellation signal is generated by using the detection signal and adjusting the phase and amplitude of the detection signal, and thus, it is easy to generate the cancellation signal that correlates with the detection signal.

In addition, the cancellation signal is input to the plurality of locations of the common electrode VCOM-ITO 150 (FIGS. 3 to 5), and thus, it is possible to reduce the voltage change depending on the location of the common electrode VCOM-ITO 150.

Note that, the present invention is not limited to the above embodiment, and various modifications can be made without departing from the scope of the spirit of the present invention. For example, the cancellation signal is generated using the detection signal generated by the hover signal generation unit 200 in the above-described embodiment, but a cancellation signal may be generated based on a voltage appearing in the common electrode VCOM-ITO 150.

Figure 6:
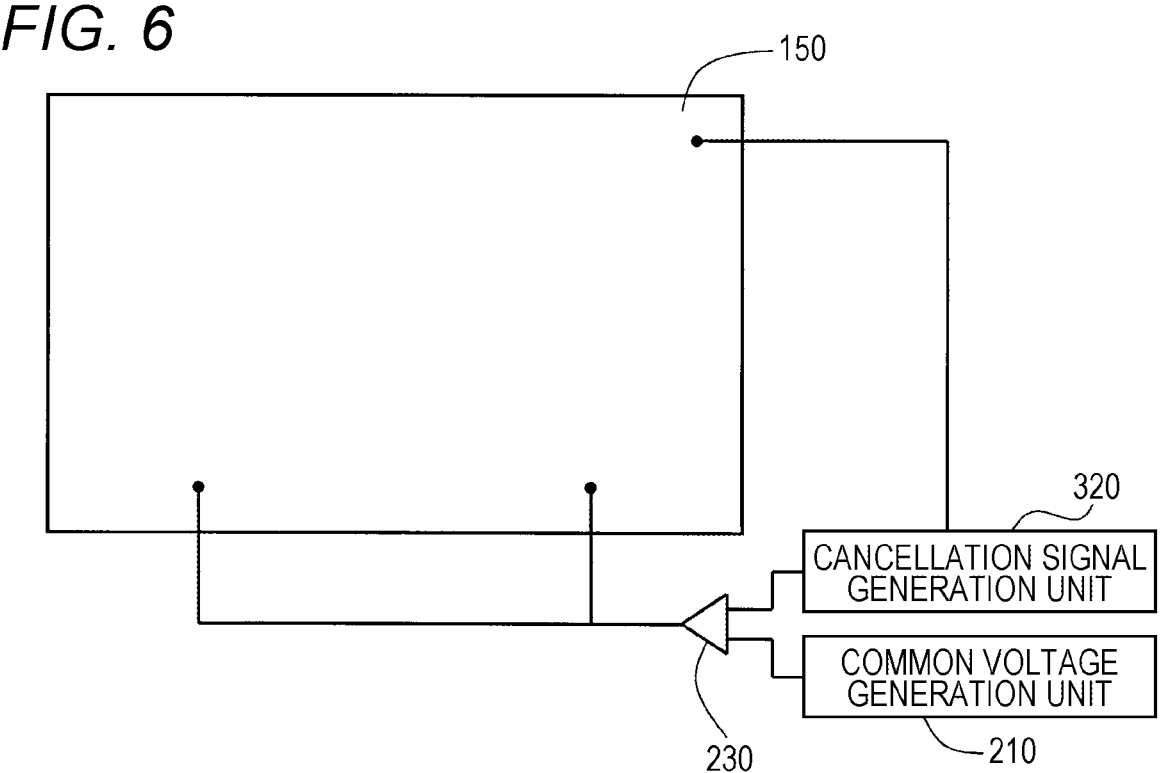
FIG. 6 is a view illustrating a modification of a cancellation signal generation unit.

FIG. 6 is a view illustrating a modification of the cancellation signal generation unit. A cancellation signal generation unit 320 illustrated in FIG. 6 adjusts a phase and an amplitude of the voltage appearing in the common electrode VCOM-ITO 150 to cancel the signal component leaking toward the common electrode VCOM-ITO 150 due to the input of the detection signal to the back side electrode BS-ITO 160, that is, to generate the cancellation signal having the same amplitude and inverted phase with respect to this signal component. Since it is considered that the voltage itself appearing in the common electrode VCOM-ITO 150 is synchronized with a detection signal (sinusoidal signal) input to the back side electrode BS-ITO 160, it is possible to generate the cancellation signal by using the voltage appearing in the common electrode VCOM-ITO 150 instead of the detection signal. Even in this case, it is easy to generate the cancellation signal that correlates with the detection signal.

In addition, although FIG. 2 according to the above embodiment illustrates the IPS (in-plane switching) type structure, the present invention can be applied to other systems as long as a structure uses a common electrode for driving a display element.

INDUSTRIAL APPLICABILITY

As described above, according to the present disclosure, when the detection signal is input to the two electrode layers for the hover operation, a signal component that leaks to the common electrode side is generated, but this component is canceled with the cancellation signal. Thus, a voltage fluctuation that occurs in the common electrode can be reduced, and the deterioration in display quality during the hover operation can be suppressed. In addition, additional structure such as a special shield layer is not required in order to reduce the voltage fluctuation generated in the common electrode so that the cost increase can be suppressed.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A liquid crystal display device comprising:
    a first electrode layer provided on a display surface side to prevent noise from being emitted from a display element to an outside;
    a second electrode layer provided outside the first electrode layer to perform position detection;
    a detection signal generation unit that generates a detection signal to be input to the first and second electrode layers for detection of an indicator approaching the display surface;
    a common electrode that applies a common voltage to drive the display element;
    a cancellation signal generation unit that generates a cancellation signal which cancels a signal component leaking from the first electrode layer to the common electrode by applying the detection signal to the first and second electrode layers; and
    a common voltage correction unit that superimposes the cancellation signal on the common voltage.

2. The liquid crystal display device according to claim 1, wherein
    the detection signal is a sinusoidal signal.

3. The liquid crystal display device according to claim 2, wherein
the cancellation signal generation unit generates the cancellation signal using the detection signal output from the detection signal generation unit.

4. The liquid crystal display device according to claim 3, wherein
the cancellation signal generation unit generates the cancellation signal by adjusting a phase and an amplitude of the detection signal output from the detection signal generation unit.

5. The liquid crystal display device according to claim 1, wherein
the cancellation signal generation unit generates the cancellation signal based on a voltage of the common electrode.

6. The liquid crystal display device according to claim 5, wherein
the cancellation signal generation unit generates the cancellation signal by adjusting a phase and an amplitude of the voltage of the common electrode.

7. The liquid crystal display device according to claim 6, wherein
the second electrode layer has a plurality of electrodes which are parallel to each of two adjacent sides of the display surface and intersect with each other, and
the detection signal is input to one end of the plurality of electrodes, and the detection signal of the indicator is extracted from another end of the plurality of electrodes.

8. The liquid crystal display device according to claim 7, wherein
the cancellation signal is input to a plurality of locations of the common electrode.

9. The liquid crystal display device according to claim 8, wherein
a display operation using the display element and an input operation of the detection signal to the first and second electrode layers are performed in parallel.

10. A liquid crystal display device comprising:
a first electrode layer provided on a display surface side to prevent noise from being emitted from a display element to an outside;
a second electrode layer provided outside the first electrode layer to perform position detection;
a detection signal generation unit that generates a detection signal to be input to the first and second electrode layers for detection of an indicator approaching the display surface, wherein the detection signal is a sinusoidal signal;
a common electrode that applies a common voltage to drive the display element;
a cancellation signal generation unit that generates a cancellation signal which cancels a signal component leaking from the first electrode layer to the common electrode by applying the detection signal to the first and second electrode layers; and
a common voltage correction unit that superimposes the cancellation signal on the common voltage;
wherein the cancellation signal generation unit generates the cancellation signal based on a voltage of the common electrode.

11. The liquid crystal display device according to claim 10, wherein
the cancellation signal generation unit generates the cancellation signal by adjusting a phase and an amplitude of the voltage of the common electrode.

12. The liquid crystal display device according to claim 11, wherein
the second electrode layer has a plurality of electrodes which are parallel to each of two adjacent sides of the display surface and intersect with each other, and
the detection signal is input to one end of the plurality of electrodes, and the detection signal of the indicator is extracted from another end of the plurality of electrodes.

13. The liquid crystal display device according to claim 12, wherein
the cancellation signal is input to a plurality of locations of the common electrode.

14. The liquid crystal display device according to claim 13, wherein
a display operation using the display element and an input operation of the detection signal to the first and second electrode layers are performed in parallel.

* * * * *